US012783829B2

(12) United States Patent
Butler et al.

(10) Patent No.: US 12,783,829 B2

(45) Date of Patent: Nov. 3, 2026

(54) FUNCTIONALLY-SPLIT RFID READER

(71) Applicant: T-Mobile Innovations LLC, Overland Park, KS (US)

(72) Inventors: Robert Keith Butler, Overland Park, KS (US); Lyle W. Paczkowski, Mission Hills, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 118 days.

(21) Appl. No.: 18/535,844

(22) Filed: Dec. 11, 2023

(65) Prior Publication Data

US 2025/0190728 A1 Jun. 12, 2025

(51) Int. Cl.
*G06K 7/10* (2006.01)

(52) U.S. Cl.
CPC ................................ *G06K 7/10475* (2013.01)

(58) Field of Classification Search
None
See application file for complete search history.

(56) References Cited

U.S. PATENT DOCUMENTS

| | | | | |
|---|---|---|---|---|
| 11,151,336 | B2 * | 10/2021 | Nikitin | G06K 7/10386 |
| 12,155,443 | B2 * | 11/2024 | Nilsson | H04B 7/024 |
| 2003/0174099 | A1 | 9/2003 | Bauer et al. | |
| 2007/0273481 | A1 * | 11/2007 | Soleimani | H01Q 1/2225 340/10.33 |
| 2008/0129485 | A1 * | 6/2008 | Tuttle | G06K 7/10128 340/539.11 |
| 2010/0070966 | A1 * | 3/2010 | Perng | G06F 8/60 717/173 |
| 2010/0137024 | A1 * | 6/2010 | Maguire | H04B 1/58 455/552.1 |
| 2014/0049379 | A1 * | 2/2014 | Pinkham | G06K 7/10356 340/10.5 |
| 2019/0205119 | A1 * | 7/2019 | Naibero | G06F 8/654 |
| 2020/0259520 | A1 | 8/2020 | Crisp et al. | |
| 2024/0202474 | A1 * | 6/2024 | Li | G06K 7/10316 |
| 2026/0044818 | A1 * | 2/2026 | Butler | G06K 7/10128 |

FOREIGN PATENT DOCUMENTS

| | | | |
|---|---|---|---|
| EP | 4571569 | A1 | 6/2025 |
| WO | 2007027220 | A2 | 3/2007 |

OTHER PUBLICATIONS

Foreign Communication From a Related Counterpart Application, Partial EP Search Report and EP Search Opinion dated May 16, 2025 EP Application No. 24218562.7.

* cited by examiner

*Primary Examiner* — Thien M Le
*Assistant Examiner* — April A Taylor

(57) ABSTRACT

A radio-frequency identification (RFID) system for identifying objects associated with RFID tags and facilitating maintenance of digital processing backends, where the RFID system includes a plurality of distributed RFID readers, and where each distributed RFID reader is defined by a radio frequency (RF) front-end and a digital processing backend that is physically isolated from each RF front-end. The RFID system further includes a controller operatively connected to the plurality of distributed RFID readers, where the controller is configured to update each distributed RFID reader without updating each RF front-end of each distributed RFID reader.

16 Claims, 8 Drawing Sheets

FUNCTIONALLY-SPLIT RFID READER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic tags are becoming ubiquitous and commonly employed by various entities (e.g., retailers, manufacturers, shipping companies, storage facilities, etc.) as tools for many applications, such as inventory tracking and related processes. Electronic tags may be based on near field communication (NFC), which is a short-range high frequency wireless communication technology in which data may be exchanged between devices over a distance of about 10-20 inches. Electronic tags also include radio-frequency identification (RFID) transponders or tags, which are objects that can be applied to or incorporated into an item, animal, or person for the purpose of identification using radio waves. Some RFID tags may comprise active tags having an internal power source (e.g., battery), while other RFID tags may comprise passive tags powered by an external power source (e.g., the RFID reader).

RFID tags typically contain two parts. The first part is an integrated circuit (IC) for storing and processing information, modulating and demodulating a radio frequency (RF) signal, and perhaps other specialized functions. The second part is an antenna for receiving and transmitting the RF signal. Some RFID tags can be read from several meters away and beyond the line of sight of the RFID reader of such RFID tags. The RFID reading device may subsequently transmit the captured data to a host device for decoding/processing the data.

In general, an RFID reader may initiate communication with an RFID tag by generating a modulated RF interrogation signal, which is configured to evoke a modulated RF response from the RFID tag, where the RF response includes coded identification data stored in the RFID tag. Thus, the RFID reader subsequently decodes the coded identification data to identify a person, article, parcel or other object associated with the RFID tag.

Various types of RFID readers are commercially available, such as handheld/portable RFID readers, fixed RFID readers (e.g., as part of a fixed infrastructure system), RFID readers attached to moveable equipment (e.g., a forklift or drone), etc. Furthermore, RFID readers may be employed for a wide range of applications, such as real-time tracking, inventory control and point-of-sale transactions in retail stores, etc.

SUMMARY

In an embodiment, an RFID system is disclosed for identifying objects associated with RFID tags and promoting maintenance of digital processing backends. The RFID system includes a plurality of distributed RFID readers, where each distributed RFID reader is defined by a radio frequency (RF) front-end and a digital processing backend that is physically isolated from each RF front-end. The RFID system further includes a controller operatively connected to the plurality of distributed RFID readers, where the controller is configured to update each distributed RFID reader without updating each RF front-end of each distributed RFID reader.

In another embodiment, a distributed RFID reader system is disclosed. The distributed RFID reader system includes a plurality of RFID radio units comprising a plurality of respective RF front-ends, where each RF front-end is configured to wirelessly communicate with at least one RFID tag. The distributed RFID reader system further includes an RFID unit configured to communicate with the plurality of RFID radio units, where the RFID unit is physically isolated from the plurality of RFID radio units, and where the RFID unit comprises a baseband processing backend configured to process RFID tag data from each RF front-end in the plurality of RFID radio units.

In yet another embodiment, a distributed RFID reader is disclosed. The distributed RFID reader includes a radio unit comprising an RF front-end configured to wirelessly communicate with at least one RFID tag. The distributed RFID reader further includes an RFID unit comprising a digital processing backend configured to communicate with the RF front-end, wherein the RFID unit is physically isolated from the radio unit.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
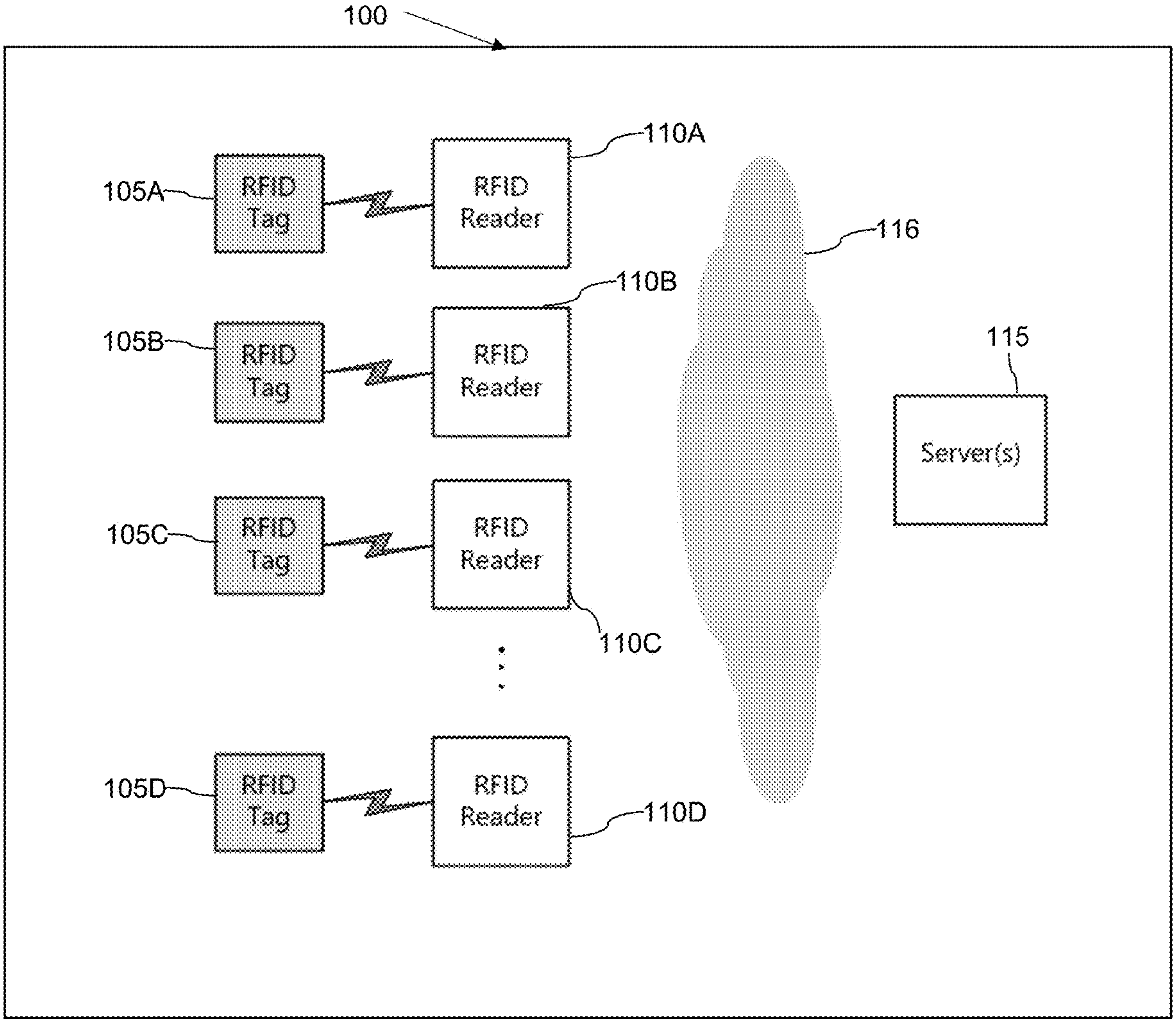
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Generally speaking, commercially available handheld RFID readers comprise fully integrated systems having all components (e.g., antennas, processing units, etc.) in a single package, while fixed RFID readers are also fully integrated except those possibly using an external antenna. An integrated RFID reader comprises two primary components: (1) a front-end portion comprising radio components (e.g., signal splitters and/or hybrids, low-noise amplifiers (LNAs), filters, variable gain amplifiers (VGAs), power amplifiers (PAs), down-converters, up-converters, local oscillator, converters, etc.) configured to handle RF signals of various frequency ranges; and (2) a control portion configured to perform digital signal processing, modulation/demodulation, anti-collision procedures, and the like. In such integrated RFID readers, the front-end portion is physically integrated with the control portion via a circuit board connection. As such, RF signals communicated via the front-end portion may be locally processed by the control portion on the integrated RFID reader itself. In some applications, however, it may not be necessary to process RF signals via the baseband control portion on the integrated RFID reader itself.

Accordingly, embodiments of the present disclosure provide a functionally-split distributed RFID reader comprising an RFID radio unit and an RFID processing unit that is physically segregated from the RFID radio unit. The RFID radio unit includes an RF front-end configured to modulate and convert received tag data into a baseband digital signal, while the RFID processing unit includes a baseband processing backend configured to decode and process the baseband digital signal. While this segregation of the RFID reader into an RF front end (e.g., RFID radio unit) and a baseband processor (e.g., RFID processing unit) runs counter to industry trends toward integration, this novel distributed RFID structure provides various benefits. Among other things, the economics, performance, operation, and management of RFID systems can be improved by splitting the functionality of the distributed RFID reader into distinct units.

For example, in drone-based deployments, a fully integrated RFID reader may be mounted to a drone, which generally adds both weight and complexity to the drone. As such, the weight of the fully integrated RFID reader and the power consumed can deplete the drone's own battery and/or reduce flight-time of the drone. As discussed further below, the RFID radio unit may generally contain fewer and less complex components than a fully integrated RFID reader, and thus weigh less than the fully integrated RFID reader. Consequently, flight time of a drone may be extended by attaching only the RFID radio unit to the drone rather than an entire RFID reader (i.e., as in conventional drone-based applications).

In addition, the RFID radio unit may generally be disposed in an area where RFID tags are present (or expected to be present), while the corresponding RFID processing unit may be disposed at another location, such as a central processing area, which may be conveniently accessed. For example, an RFID system may include an array of fully integrated RFID readers mounted to a ceiling, in which case a ladder may be needed to individually access each RFID reader (e.g., in case of updates or repairs). By comparison, the RFID system may alternatively be implemented using an array of distributed RFID readers, where the RFID radio units may be mounted to the ceiling (e.g., in a grid pattern), while a single RFID processing unit configured to communicate with the RFID radio units may be located closer to ground level for quick/easy access.

In practice, the RFID radio unit is less likely to require as many updates than the RFID processing unit, which again may be disposed in an easily accessible location. Consequently, protocols and functionality of the distributed RFID reader may be updated by updating only the RFID processing unit, while using the same front-end in the RFID radio unit. Furthermore, the RFID radio unit may comprise an integrated hub for connecting the distributed RFID reader to a plurality of external antennas, without the need for RF cables, which may be prone to power losses due to attenuation. These and other aspects are detailed herein. In other words, in conventional integrated RFID readers, which may be mounted to ceilings to give good field-of-view to the antennas of the RFID reader, an update to an RFID processing unit (referred to in some contexts as a digital processing backend or as a baseband processing backend) may entail stationing a ladder proximate to the integrated RFID reader, climbing the ladder, and conducting the update by a technician on the ladder. By contrast, updating the RFID reader in the split-configuration described herein would allow the update to the RFID processing unit to be conducted more conveniently and safely on the floor or in an office area.

Turning now to FIG. 1, a system 100 is described. For discussion purposes, FIG. 1 will be described according to an implementation in which the system 100 comprises a warehouse management system (WMS) configured to house various pieces of items within one or more locations. However, it is to be understood that the system 100 may be implemented as one or more different types of systems in other applications employing RFID technology, e.g., for automatic identification, inventory control, asset tracking, security surveillance, livestock tracking, medical diagnostics, etc.

The WMS 100 comprises a plurality of RFID tags 105A-105D configured to store information (e.g., unique identifiers, tracking data, etc.) associated with items stored or situated in one or more designated locations within the WMS 100. The RFID tags 105A-105D may comprise one or more active RFID tags, one or more passive tags, or a combination of active RFID tags and passive RFID tags. Thus, WMS 100 may comprise one or more different types of RFID tags 105A-105D in some implementations.

For ease of illustration, only 4 RFID tags 105A-105D are depicted in FIG. 1, but it should be understood that more or less RFID tags may be deployed according to embodiments of the disclosure. For instance, the system 100 may comprise a plurality of storage bins and/or shelfs, with each bin and/or shelf containing a plurality of items having RFID tags. Hence, the WMS 100 may comprise hundreds, thousands or more RFID tags in various implementations.

The WMS 100 comprises one or more RFID readers 110A-110D configured to scan and decode information (e.g., identification codes) stored in RFID tags 105A-105D, which may become activated when within a certain proximity to at least one RFID reader. If the RFID tags 105A-105D include one or more passive tags, such passive tags may be powered by energy radiated by one or more RFID readers 110A-110D. For example, the RFID readers 110A-110D may be configured to generate a continuous wave (CW) signal to activate and power each passive tag during data transfer.

Note that distances between the RFID tags 105A-105D and the RFID readers 110A-110D may vary, and each individual RFID reader 110A-110D may be capable of detecting any one or more of the RFID tags 105A-105D in the WMS 100. Thus, while the WMS 100 is shown as having an equal quantity of RFID tags 105A-105D and RFID readers 110A-110D, the WMS 100 may include a different quantity of RFID readers in other implementations. For example, the WMS 100 may include a single RFID reader configured to detect a plurality of RFID tags.

Each RFID reader 110A-110D is configured to communicate with one or more RFID tags 105A-105D within the coverage area of each RFID reader 110A-110D. For example, the RFID readers 110A-110D may be configured to request data from the RFID tags 105A-105D by transmitting an RF signal. The RF signal may be used to perform one or more RFID operations. Briefly, for example, the RF signal may be configured to interrogate/read one or more RFID tags 105A-105D, and/or to (re) program/write one or more RFID tags 105A-105D. In response, each activated RFID tags 105A-105D may return the requested data by modulating and backscattering the RF signal from the RFID readers 110A-110D, which may each be configured to convert the received backscattered signal into a digital signal for processing. Such processing may include, for example, converting the digital signal into symbols representing identification data of the RFID tag, and employing one or more demodulation schemes to decode the received RFID tag data.

As discussed further below, while each RFID reader 110A-110D is shown as an individual block in FIG. 1, each RFID reader 110A-110D defines an RFID system (e.g., FIG. 6) comprising a distributed RFID reader composed of two distinct units: (1) an RF front-end radio unit configured to modulate and convert received tag data into a digital signal, and (2) an RFID baseband processing unit configured to decode and process the digital signal, where the RFID baseband processing unit is physically segregated from the RF front-end. In other words, the distributed RFID readers 110A-110D of FIG. 1 differ from fully integrated RFID readers of conventional systems in which the RF front-end portion is physically coupled to the baseband processing portion (e.g., via circuit board traces). "Baseband processing" as used herein generally refers to the overall processing of information conveyed in signals received from RFID tags. In an embodiment, the RF radio unit may operate in a licensed cellular frequency band at high power levels and communicate with RFIDs over distances, e.g., up to 50 feet, up to 100 feet, up to 150 feet and/or less than 200 feet, etc. It should be understood that the RF radio unit may communicate with RFID devices over even larger distances (e.g., miles) in other embodiments.

Note that the quantity of RFID readers 110A-D may vary from system to system. While 4 RFID readers 110A-D are shown in FIG. 1, it should be understood that the system 100 may comprise more or less RFID readers 110A-110D in other implementations. Moreover, the RFID readers 110A-110D may be implemented in a variety of forms, such as fixed readers, handheld readers, ground-based readers, airborne readers, etc. Furthermore, any one or more of the RFID readers 110A-110D may comprise a battery powered reader and/or an externally powered reader.

In one example, the RFID readers 110A-110D may comprise an array of RFID readers 110A-110D arranged at fixed locations, e.g., along one or more walls, ceilings, portals, doors, or other objects of the WMS 100. In another example, the RFID readers 110A-110D may be mounted to one or more pieces of equipment, such as a forklift, a robot, etc. In yet another example, the WMS 100 may employ one or more unmanned aerial vehicles such as a fleet of drones with the RFID readers 110A-110D mounted thereon. Furthermore, the RFID readers 110A-D need not be the same, and one or more RFID readers 110A-D may be deployed differently. For instance, one RFID reader 110A may be mounted to a drone, while another RFID reader 110B may be a stationary reader disposed at a fixed location (e.g., ceiling, near a conveyer belt, etc.) within the WMS 100. In some aspects, one or more of the RFID readers 110A-110D may be integrated with barcode scanners such that both barcode and RFID tag identification may be performed simultaneously.

The WMS 100 further comprises at least one server 115 communicatively coupled to the RFID readers 110 via a network 116. In operation, each RFID reader 110A-110D may be configured to scan information from an RFID tag 105 and send the scanned information to the server 115 for processing. For example, the server 115 may comprise at least one application 120 (e.g., middleware) configured to process data from each RFID reader 110A-D and to communicate commands/information one or more RFID tags 105A-105D via one or more RFID readers 110A-110D. In some aspects, the server 115 may be coupled to another server and/or network connection.

As previously mentioned, conventional RFID readers comprise fully integrated units, meaning the RF front-end of each conventional RFID reader is physically integrated with the baseband processing backend of each conventional RFID reader. While it may be convenient and/or cost-efficient to have the RF front-end integrated with the baseband processing backend in a single RFID reader package, one or more issues may arise when such fully integrated RFID readers are deployed in certain applications.

For example, some facilities (e.g., warehouses, retail departments) commonly employ moveable devices such as a drone or a fleet of drones, with each drone having an integrated RFID reader mounted thereon. In the case of a drone-mounted reader deployment, the integrated RFID reader may draw power from a battery powering the drone, which may lead to reduced flight duration due to power consumed by the integrated RFID reader (e.g., when processing RF signals by the control portion). Alternatively, the integrated RFID reader may be powered by a separate battery carried on the drone. However, the added weight of the separate battery can reduce the drone's flight time as well as the range of the drone.

For another example, some facilities implement fixed-reader deployments, which generally include stationary RFID readers having integrated antennas or external antennas. In a case of the former, an array of integrated RFID readers may be provided as part of an RFID system with an integrated antenna, where an on-board processor in the control portion may be configured to handle beamforming, steering, orientation, polarization, etc. However, such RFID systems are typically costly, and multiple integrated RFID readers are typically necessary in order to cover large areas and to accurately identify/locate items (e.g., tags). Moreover, separate hardware and/or software need to be distributed, managed, and maintained in each integrated RFID reader. Thus, when new software is available, an operator may need to manually update each integrated RFID reader, which may take considerable time depending on the number of integrated RFID readers to be updated. Further, such manual updates may become cumbersome as integrated RFID readers in fixed RFID systems are often mounted on a ceiling or other hard to reach areas.

In another case of fixed-reader deployments, a fully integrated RFID reader may be disposed at a fixed location, with the integrated RFID reader attached to one or more external antennas configured to read RFID tags. Like the case of fixed-readers having integrated antennas, the use of externally-connected antennas means separate hardware and/or software need to be distributed, managed, and maintained in each integrated RFID reader. Moreover, significant power loss may occur in the RF cables connecting the external antennas to each integrated RFID reader. Furthermore, even if one or more such integrated RFID reader can be centrally located, the distance from the integrated RFID reader to the external antennas may be significant, particularly when moving to a licensed spectrum where read ranges may be increased (and where antennas may be farther apart from one another). Power losses in the cables connecting the external antennas can significantly impact performance.

Thus, it can be seen from above that fully integrated RFID readers may be suboptimal for certain applications. Embodiments of the present disclosure aim to optimize RFID deployments by providing a functionally-split distributed RFID reader in which the RF front-end is physically segregated from the baseband processing backend.

Figure 2:
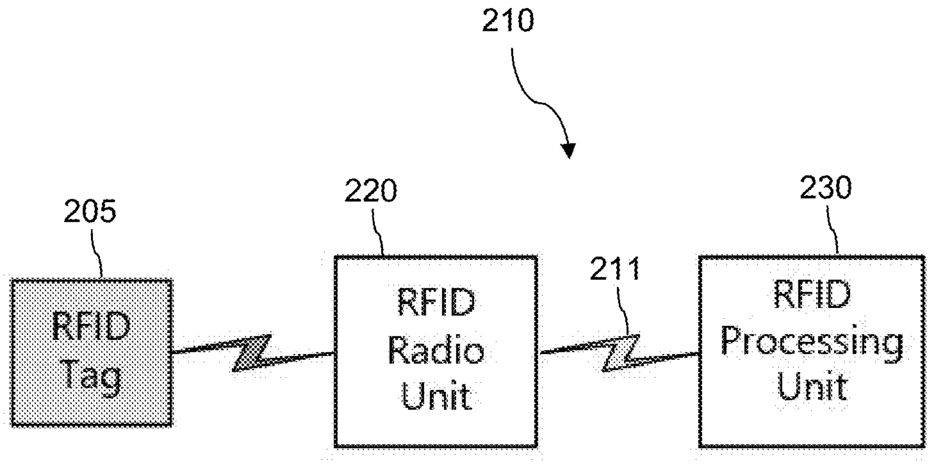
FIGS. 2-4 depict example implementations of a distributed RFID reader according to embodiments of the present disclosure.

The distributed reader 210 depicted in FIG. 2 is representative. The distributed RFID reader 210 comprises an RF radio unit 220 and an RF baseband processing unit 230 configured to communicate with one another, where the RF radio unit 220 and the RF baseband processing unit 230 are physically separate from one another. In FIG. 2, for example, the RF radio unit 220 and the RF baseband processing unit 230 are configured to communicate wirelessly with one another over a wireless communication channel 211. In some aspects, the wireless communication channel 211 may comprise a direct wireless link established between the RF radio unit 220 and the RF baseband processing unit 230. This radio link may be at same frequency as the radio link to the RFID tag 205 or at a different frequency.

The RF radio unit 220 and the RF baseband processing unit 230 are discussed in greater detail below with respect to FIG. 6. Briefly, the RF radio unit 220 includes a front-end configured to wireless communicate with an RFID tag 205, which may be similar to those shown in FIG. 1. The front-end of the RF radio unit 220 is further configured to modulate and convert received tag data into a digital signal, which may be wirelessly transmitted to the RF radio processing unit 230. The RF radio processing unit 230 includes a baseband processing backend configured to decode and process the digital signal. Because the RF radio processing unit 230 is physically segregated from the RF radio unit 220, the RF radio processing unit 230 may process the digital signal at a location remote to where the RF radio unit 220 receives the data from the RFID tag 205.

For example, the RF radio unit 220 may be collocated with one or more antennas on a ceiling, e.g., so as to promote line-of-sight and/or RF communication between the RFID radio unit 220 and the RFID tag 205. Meanwhile, the RF processing unit 230 may be located away from the ceiling, e.g., at a location easily accessible from the floor. This can facilitate making updates to the firmware/middleware/software of the RFID baseband processing unit 230, e.g., installing patches, installing improved software, adding and/or updating drivers, etc. In practice, the pace of updating software on the RFID processing unit 230 may be considerably higher than the pace of updating anything in the RF radio unit 220.

Figure 3:
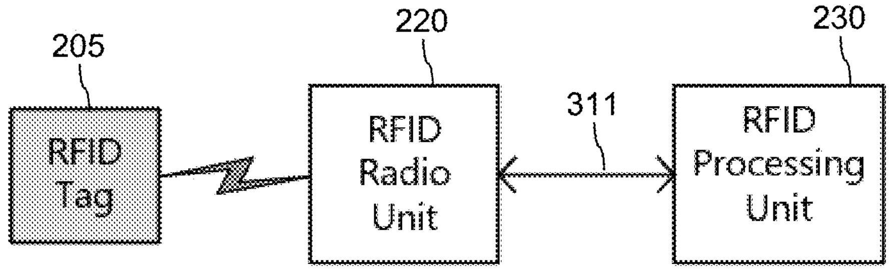

FIG. 3 is similar to FIG. 2, except FIG. 3 depicts an embodiment where the RF radio unit 220 and the RF processing unit 230 communicate with another over a direct wired link 311, e.g., Ethernet, a proprietary high-speed digital link, etc. In some aspects, the RF radio unit 220 and the RF processing unit 230 may communicate with one another over the direct wired link 311 while residing in different locations. For example, the RF radio unit 220 and the RF processing unit 230 may be placed in different rooms. For another example, the RF radio unit 220 may be placed attached to a ceiling of a structure, while the RF processing unit 230 may be situated at or closer to a floor of the structure.

Figure 4:
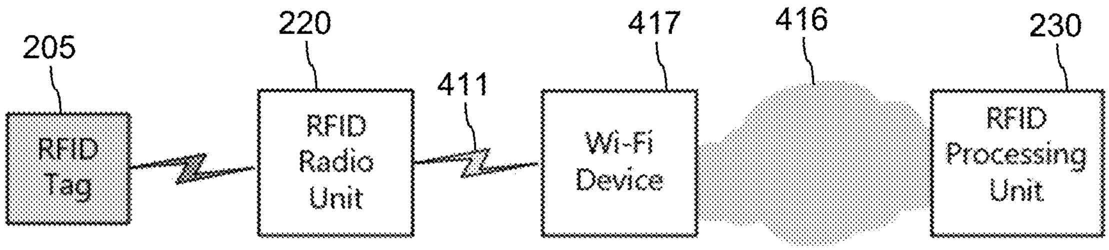

FIG. 4 is similar to FIG. 2, except FIG. 4 depicts an embodiment where the RF radio unit 220 wirelessly communicate with another via a wireless device 417. The wireless device 417 may, for example, comprise a Wi-Fi router configured to communicate with the RF radio unit 220 over a wireless link 411. In some aspects, the Wi-Fi device 417 may comprise a stationary device or a portable device. The Wi-Fi device 417 may be further configured to establish communication with the RF radio processing unit 230 via a network 416 such as an enterprise network, a local area network (LAN), etc. Because the RF radio unit 220 and the RF processing unit 230 may wirelessly communicate with another, the RF radio unit 220 and/or the RF processing unit 230 may be implemented as portable units. Further, the RF radio unit 220 and the RF processing unit 230 may be situated in different locations.

Figure 5:
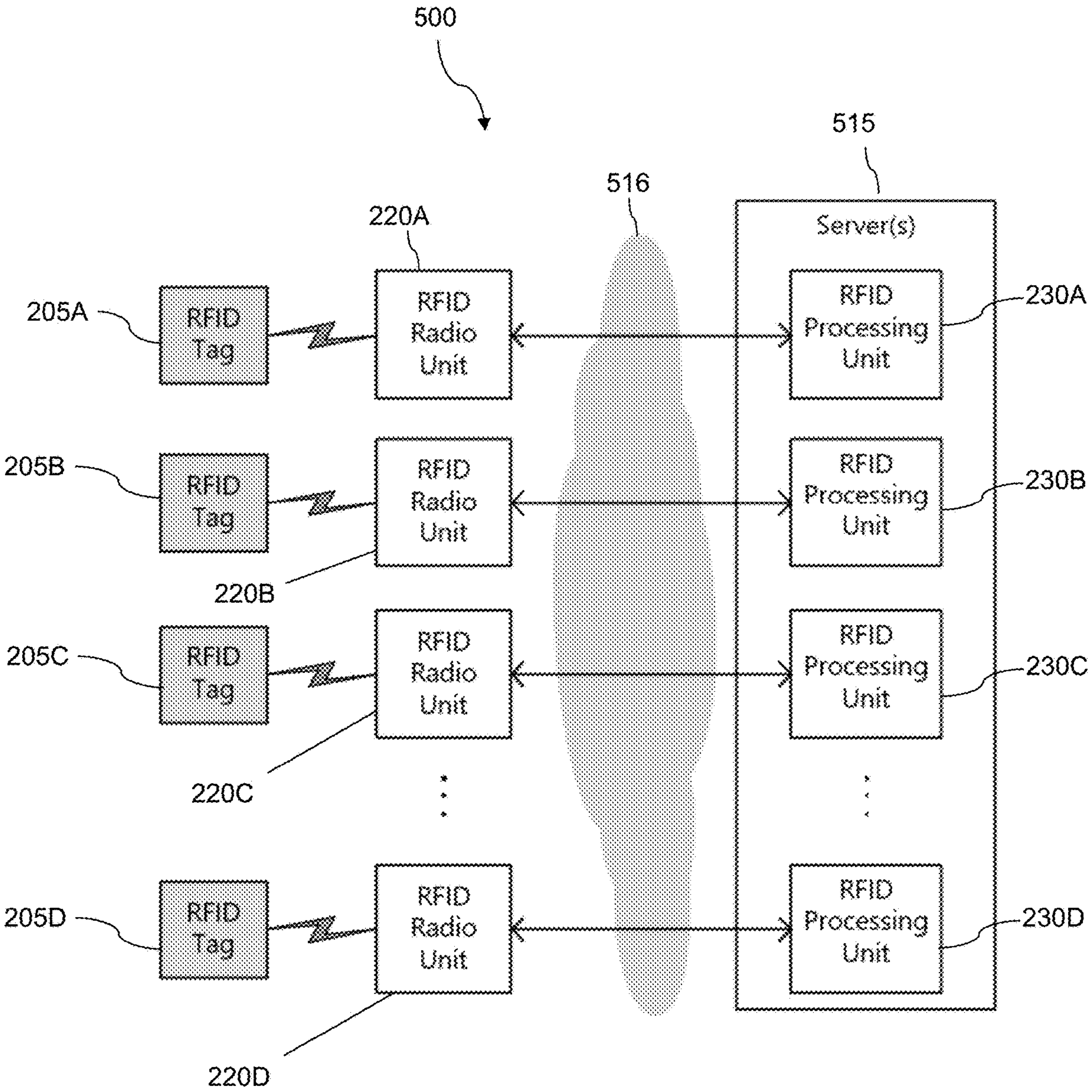
FIG. 5 is a block diagram of a system according to an embodiment of the disclosure.

FIG. 5 depicts a system 500 according to an embodiment of the disclosure. The system 500 comprises a plurality of distributed RFID readers corresponding to the distributed reader 210. Thus, each distributed RFID reader comprises an RF radio unit 220A-220D configured to wirelessly communicate with one or more RFID tags 205A-205D. Each distributed RFID reader further comprises an RFID processing units 230A-230D physically segregated from each respective RF radio unit 220A-220D. In an embodiment, each RFID processing unit 230A-230D may be implemented in one or more servers 515 (e.g., server 115). The RF radio units 220A-220D may each communicate with the RFID processing units 230A-230D over at least one network 516 (e.g., network 116), e.g., an enterprise network, LAN, radio access network (RAN), etc. The at least one network 560 may comprise any one or more of a wired network, a wireless network, or a hybrid network (e.g., a network configured to support wired and wireless connections).

Generally speaking, the one or more servers 515 may be implemented via hardware and/or software. In some aspects, the one or more servers 515 may comprise one or more virtual servers, which may be implemented at a location remote to the RF radio units 220A-220D. For example, the one or more virtual servers 515 may be implemented in software via one or more clouds. In some aspects, the one or more servers 515 may comprise one or more physical servers. In some aspects, the one or more servers 515 may comprise at least one virtual server and at least one physical server. In some aspects, the one or more servers 515 may comprise one or more cloud servers, which may be configured to run as virtual machines or software systems that emulate computers. In some aspects, the one or more servers 515 may comprise any one or more of a physical server, virtual server, or cloud server.

In some aspects, the plurality of RFID processing units 230A-230D may be implemented as a single RFID processing unit configured to handle baseband processing of signals for all of the RFID radio units 220A-220D. For example, by separating the RF front-end processing from the digital baseband processing via two distinct RF units, the digital baseband processing of tag data may be performed at a remote location, such as a centralized processing center having more powerful processing capabilities than an individual RFID processing unit 220.

Figure 6:
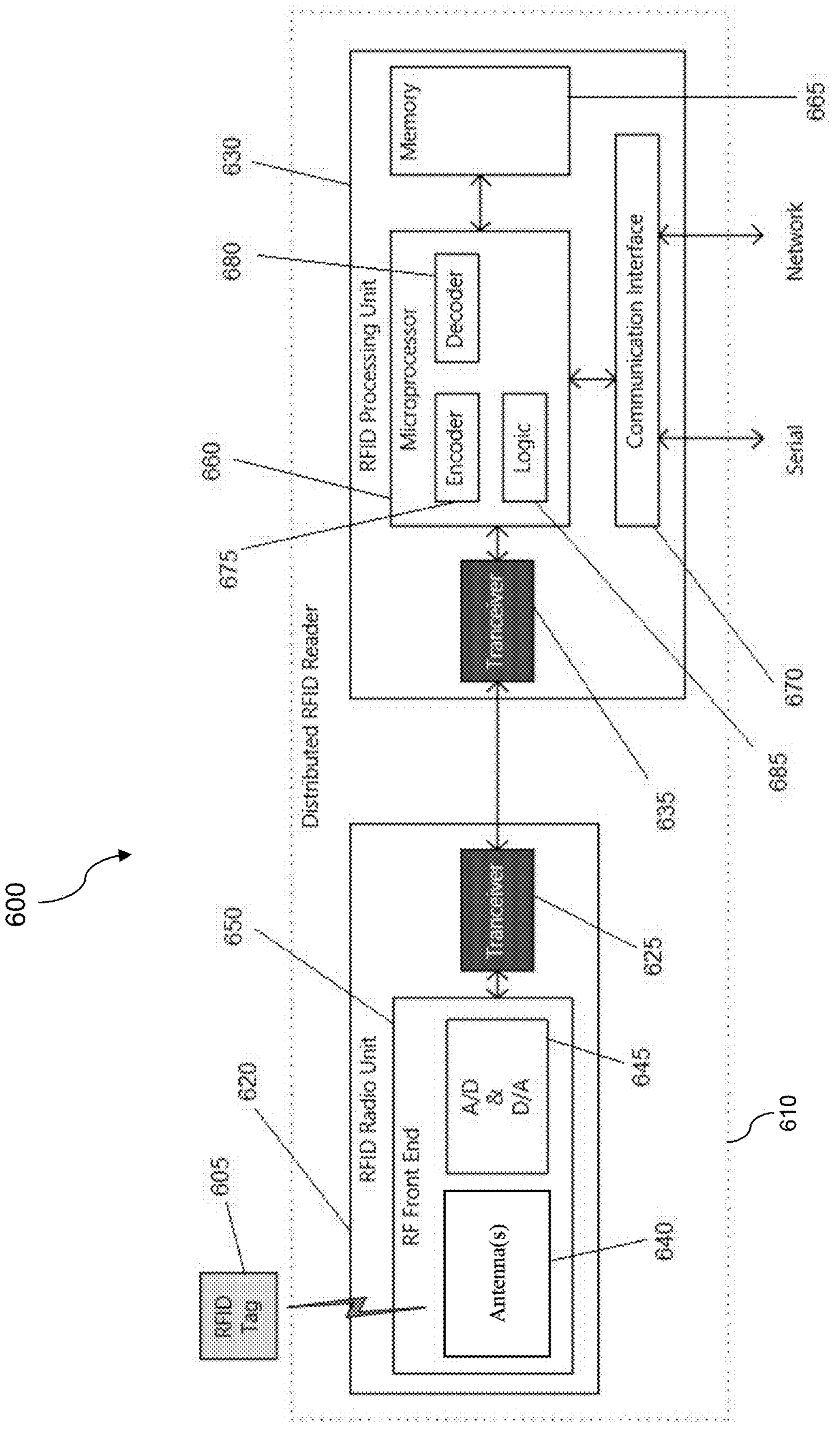
FIG. 6 is a schematic diagram of a distributed RFID reader according to an embodiment of the disclosure.

FIG. 6 depicts an RFID reader system 600 according to an embodiment of the present disclosure. The RFID reader system 600 comprises a distributed RFID reader 610, which is representative of the those discussed above with respect to FIGS. 1-5. The RFID reader 610 comprises an RFID radio unit 620 and an RFID baseband processing unit 630 configured to communicate with the RFID radio unit 620. To this end, the RFID radio unit 620 comprises a first transceiver 625 and the RFID processing unit 630 comprises a second transceiver 635 configured to communicate with the first transceiver 625. In some aspects, communication between the first transceiver 625 and the second transceiver 635 may take place over a wireless connection (e.g., Wi-Fi, Bluetooth, NFC, etc.), such as described with respect to FIGS. 2 and 3. In other aspects, such communication may take place over a wired connection (e.g., via Ethernet), such as described with respect to FIG. 4.

The RFID radio unit 620 comprises an RF front-end portion 650 including one or more antennas 640 for receiving/transmitting RF signals between the RFID radio unit 620 and an RFID tag 605, which may be similar to those shown in FIGS. 1-5. In some aspects, the RF front-end 650 may be configured to transmit a power signal to the RFID tag 605 in a frequency band between 2.95 gigahertz (GHz) and 3.0 GHZ. As discussed further below with respect to FIG. 7, the RF front-end 650 includes one or more converters 645 for performing analog-to-digital (A/D) data conversion and digital-to-analog (D/A) data conversion.

In some aspects, the one or more antennas 640 may comprise an array of antennas configured to support beamforming, frequency hopping, or the like. Further, while the one or more antennas 640 are shown as being internal antennas, the one or more antennas 640 may be externally connected to the RF front-end 650 in other implementations. An example of such an implementation is described further below with respect to FIG. 8.

The RFID processing unit 630 comprises at least one microprocessor 660 coupled to the second transceiver 635. The microprocessor 660 may comprise a single processing unit or multiple processing units. Additionally, the microprocessor 660 may comprise any suitable processing unit such as a controller, microcontroller, digital signal processor (DSP), central processing unit (CPU), programmable logic device, state machine, analog circuitry, digital circuitry, etc.

The RFID processing unit 630 further comprises at least one memory 665 coupled to the microprocessor 660, and at least one communication interface 670 coupled to the microprocessor 660. The communication interface 670 may communicate with a host device (e.g., a computer, server(s) 115, server(s) 515, etc.) via a serial communication link and/or a network interface. In some aspects, the communication interface 670 is configured to support multiple network protocols such as Ethernet, transmission control protocol (TCP), user datagram protocol (UDP), hypertext transfer protocol (HTTP), or the like.

The microprocessor 660 may comprise at least one encoder 675 and decoder 680 configured to encode and decode data signals to be processed by the microprocessor 660. To this end, the microprocessor 660 may comprise at least one logic unit 685 configured to perform digital signal processing of data and the like. Data input/output by the logic unit 685 may be stored in memory 665 along with other pieces of data. For example, the memory 665 may be configured to store signals received from the RFID tag 605, configuration parameters of the RFID reader 610, codes/instructions to be executed by the microprocessor 660, etc. In some aspects, the RFID processing unit 630 may further include and/or connect to a power source. Similarly, the RF radio unit 620 may further include and/or connect to a power source.

In operation, the microprocessor 660 is configured to generate and provide digital data to be encoded by the encoder 675. The encoder 675 may then output the digitally encoded data to the RF front end 650 (e.g., via the first and second transceivers 625, 635), which may convert the digitally encoded data into an analog signal. Additionally, the RF front-end 650 may modulate the analog signal to generate an RF signal at a particular carrier frequency to be transmitted via the one or more antennas 640 to the RFID tag 605.

When receiving an RF signal from the RFID tag 605 via the one or more antennas 640, the RF front end 650 may convert the received RF signal into a baseband signal, which the one or more converters 645 may convert into a digital signal to be processed by the microprocessor 660 in the RFID baseband processing unit 630. For example, the encoder 675 may encode the digital signal and output the encoded data to the decoder 680, which is configured to decode the encoded data. The logic unit 685 may then process the decoded data to identify the item(s) associated with the RFID tag 605. The decoded data may be stored in the memory 665 and/or provided to a server (e.g., via the communication interface 670) for further processing.

Figure 7:
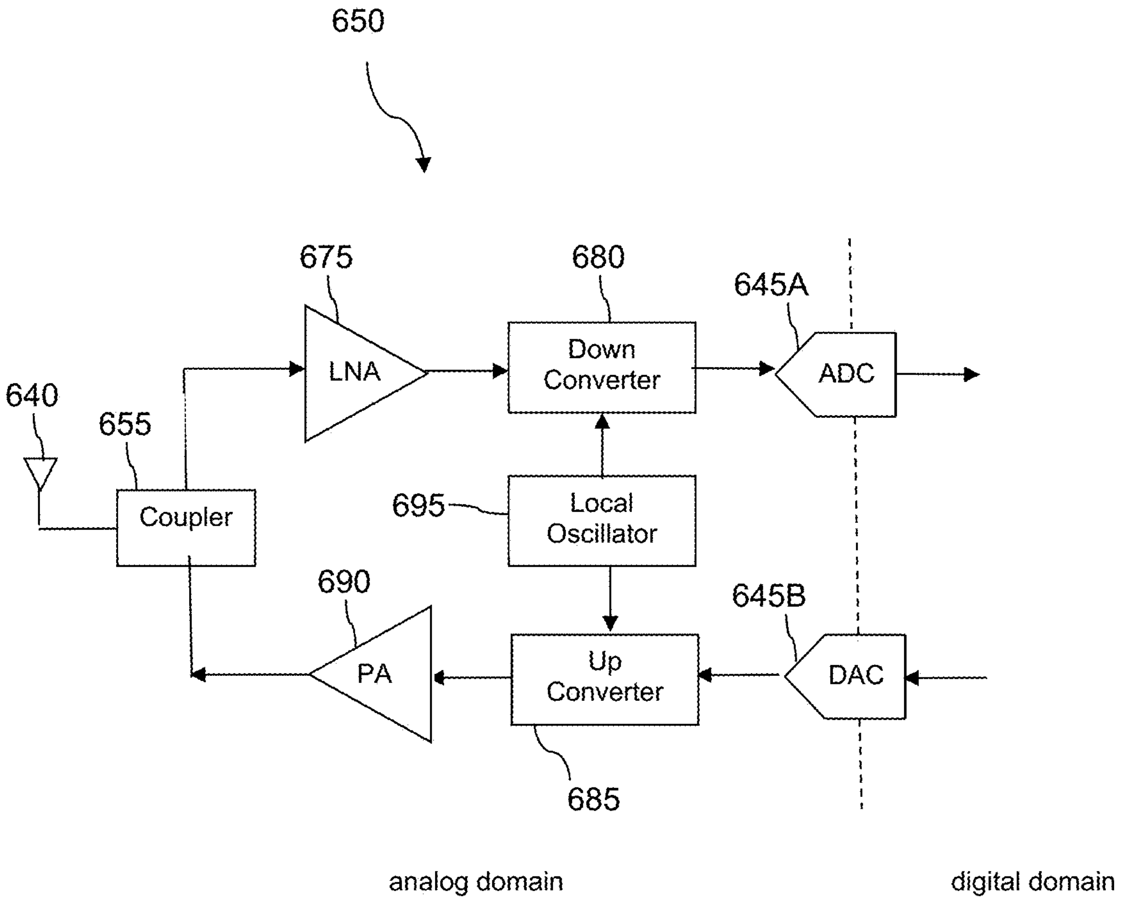
FIG. 7 is an enlarged detailed view of the RFID front-end shown in FIG. 6.

FIG. 7 depicts an enlarged and more detailed view of the front-end portion 650 depicted in FIG. 6. The RF front-end portion 650 includes at least one antenna 640 configured to support bilateral RF communication, and at least one coupler 655 configured to support such bilateral RF communication and provide isolation between received RF signals and transmitted RF signals. The coupler 655 may be implemented in a variety of manners. For example, the at least one coupler 655 may include any suitable components and/or coupling/connecting devices such as one or more RF transformers, RF filters, cables, ports, sockets, pins, wire leads, plugs, or the like. In some implementations, the at least one coupler 665 may be a directional coupler comprising continuously coupled homogenous wires. While FIG. 7 depicts the use of a single antenna, it should be understood that the system 650 may comprise a separate antenna for transmission and reception, in which case the RF front-end 650 may be implemented without the coupler 655.

When the at least one coupler 655 receives an RF signal from the at least one antenna 640, the received RF signal may be of relatively low strength. Hence, the front-end portion 650 may include a low-noise amplifier (LNA) 675 configured to boost the received signal's amplitude without introducing noise (e.g., as may occur using a conventional amplifier). The LNA 675 may then output the boosted signal at a certain radio frequency to a down converter 680, which is configured to down-convert the boosted signal, i.e., shift the boosted signal to a lower frequency. In some aspects, the down converter 680 may include one or more mixers configured to mix modulated RF signals with an oscillation signal to generate baseband signals. As previously mentioned, the front-end portion 650 may include an analog-to-digital converter (ADC) 645A configured to convert the down-converted analog signal into a digital signal. The RF front end 650 may then output the digital signal to the RFID processing unit 630 (e.g., via transceiver 635) for further processing by the at least one microprocessor 660.

When the at least one coupler 655 is to transmit an RF signal to the RFID tag 605 through the one or more antennas 640, the RF front-end portion 650 may first receive a digital signal from the baseband processing unit 630. Hence, the front-end portion 650 includes a digital-to-analog converter (DAC) 645B configured to convert the digital signal into an analog signal, which may then be output to an up-converter 685 configured to shift the analog signal to a certain frequency. The RF front-end portion 650 further includes a power amplifier (PA) 690 configured to amplify the up-converted signal. The PA 690 may then output the amplified analog signal through the coupler 655 to the one or more antennas 640, where the amplified analog signal may be broadcasted out to at least one RFID tag 605.

The front-end portion 650 may further include at least one local oscillator (LO) 695 configured to generate an RF carrier signal in a desired frequency band, which may depend on a particular RFID protocol and/or distance between the RFID processing unit 620 and RFID tag 605. For example, various frequency bands may include 30-500 kilohertz (kHz), 850-960 megahertz (MHz), 900-931.3 MHz, 13.56 MHZ, 2.45 GHZ, 2.95-3.0 GHZ, etc. In some aspects, the LO 695 may output the RF carrier signal to the down converter 680, which may mix the RF carrier signal with an inbound modulated RF signal (e.g., from RFID tag 605) to generate an analog baseband signal. The ADC 645A may then convert the analog baseband signal into a digital baseband signal for processing via the RFID baseband processing unit 630. In some aspects, the LO 695 may output the RF carrier signal to the up converter 685, which may mix the RF carrier signal with an analog signal output by the DAC 645B to generate a modulated analog signal. This modulated analog signal may then be output to the PA 690 for amplification.

It should be understood that the RF front-end 650 may comprise different components in other implementations. For another example, the RF front-end 650 may comprise one or more filters, synthesizers, switches, multiplexers, capacitors, resistors, or the like. Nevertheless, the RF front-end 650 may be less complex and/or costly than the RFID baseband processing unit 630, as it may not be necessary for the RF front-end 650 to perform complex processing functions such as performed by the baseband RFID processing unit 630. As such, it may not be necessary for the RF front-end 650 to include dedicated signal processing units, thereby reducing weight of the RF radio unit 620.

In some aspects, the RF front-end 650 may comprise internal memory configured to store received data from the RFID tag 605. This way, data stored in such memory may be used to compensate for short-term network failures, e.g., a broken communication link between the RFID radio unit 620 and the RFID processing unit 630.

Figure 8:
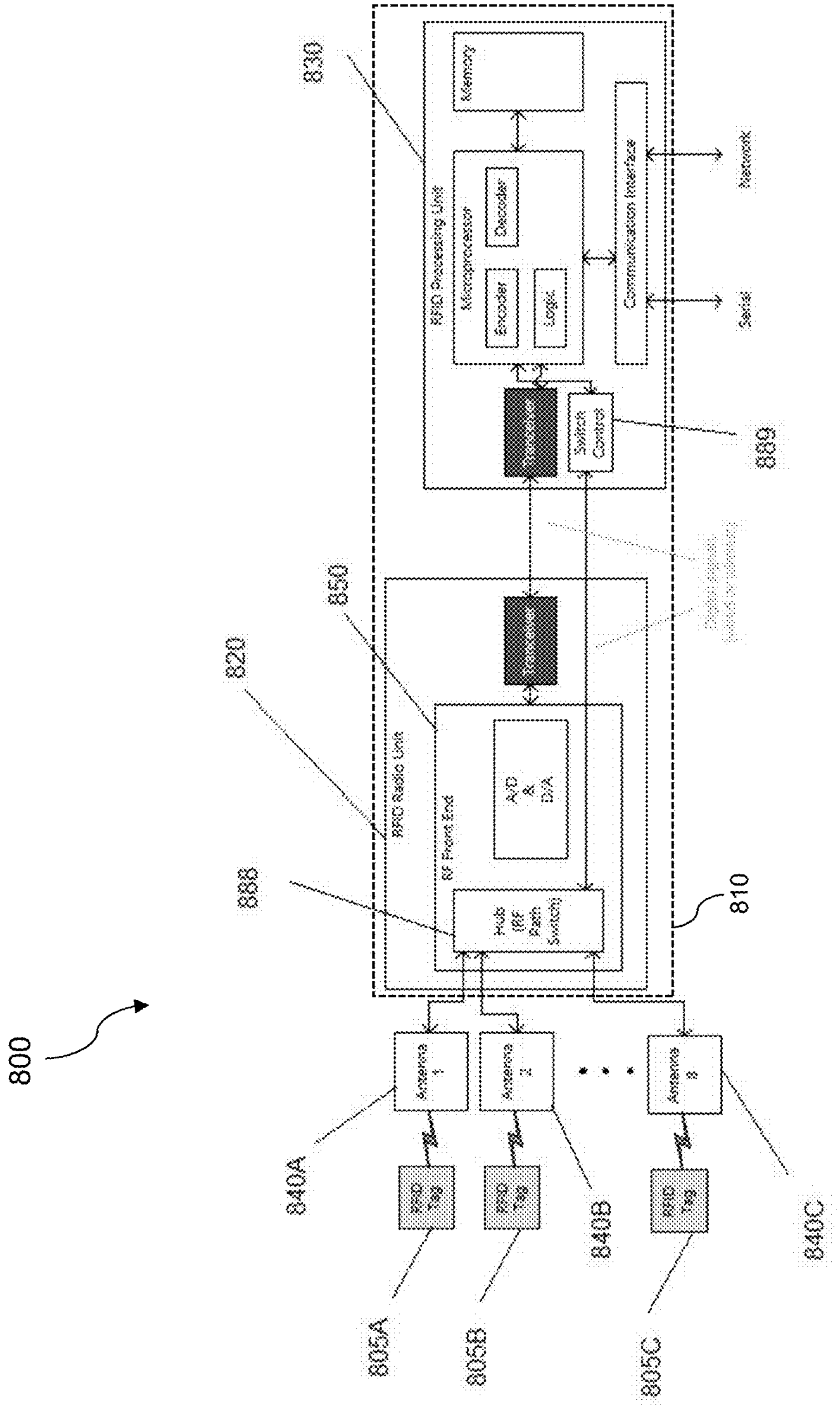
FIG. 8 is a schematic diagram of an RFID system according to an embodiment of the disclosure.

FIG. 8 depicts an RFID system 800 according to an embodiment of the present disclosure. The RFID system 800 comprises a distributed RFID reader 810 configured to wirelessly communicate with one or more RFID tags 805A-805C via one or more antennas 840A-840C. The distributed RFID reader 810 comprises an RFID radio unit 820 and an RFID processing unit 830 that is physically segregated from the RFID radio unit 820. The RFID radio unit 820 comprises an RF front-end 850 similar to the RF front-end 650, except the RF front end 850 may comprise a hub (or switch) 888 instead of one or more antennas 640. The RFID processing unit 830 is similar to the RFID processing unit 650, except the RFID processing unit 830 may further include a switch controller 889 configured to control connectivity between the hub and the one or more antennas 840A-840C, e.g., based on a switch control signal from the microprocessor 660.

It should be noted that a conventional fully integrated RFID reader may be capable of connecting to a plurality of antennas using an external hub between the integrated RFID and the antennas. However, power losses (e.g., due to attenuation) can occur in the RF cables connecting the antennas to the integrated RFID reader that is remotely located. In addition, the baseband processing section of such an integrated RFID reader is typically limited to reading data from a given tag using only one antenna at a time. This limitation can pose an encumbrance, especially when attempting to scan large quantities of RFID tags.

By comparison, the distributed RFID reader 810 in FIG. 8 is capable of reading data from the RFID tags 805A-805C using all of the antennas 840A-840C simultaneously. The RFID processing unit 830 may process data read from each RFID tag 805A-805C at a different location (e.g., a centralized processing center) than where the RFID radio unit 820 reads such data (i.e., unlike conventional systems where tag data is both read and processed locally on the integrated RFID reader itself). Further, since RF cables are not necessary to establish connection between the RFID radio unit 620 RF and the antennas 840A-840C, power losses due to attenuation can be eliminated or reduced.

Figure 9:
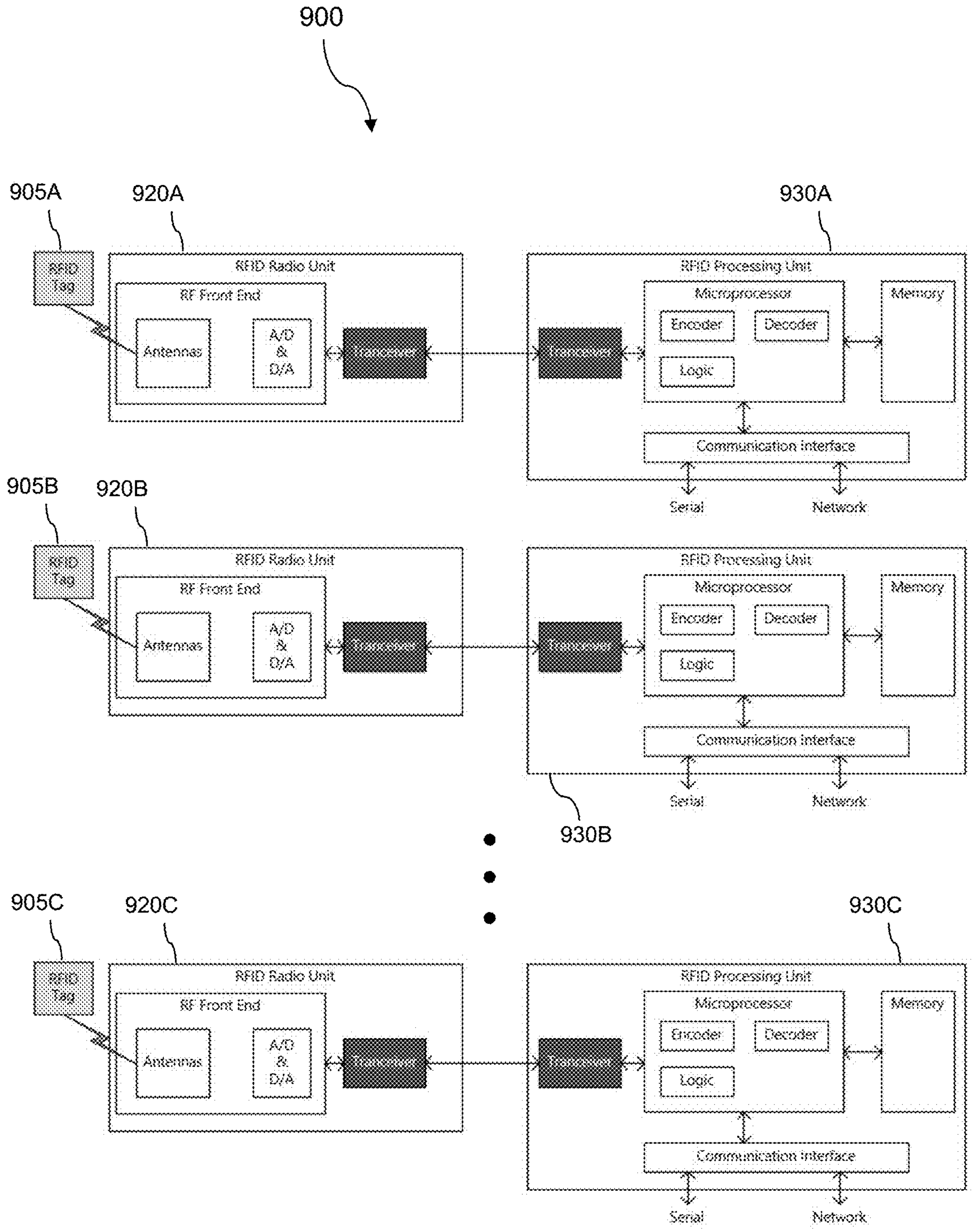
FIG. 9 is a schematic diagram of an RFID system according to an embodiment of the disclosure.

FIG. 9 depicts an RFID system 900 according to an embodiment of the present disclosure. The RFID system 900 comprises a plurality of distributed RFID readers defined by pairs of RFID radio units 920A-920C and RFID processing units 930A-930C. Each RFID radio unit 920A-920C is similar to the RFID radio unit 820 in FIG. 8, except the RFID radio units 920A-920C comprise one or more antennas 940A-940C configured to wirelessly communicate with one or more RFID tags 905A-905C (i.e., instead of a hub 888 configured to connect to one or more antennas 840A-840C). Each RFID processing unit 930A-930C is similar to the RFID processing unit 830 in FIG. 8, except no switch controller 888 is provided in the RFID processing units 930A-930C since each RFID processing unit 930A-930C may only need to manage the one or more antennas 940A-940C in each corresponding RFID radio unit 920A-920C.

It will be appreciated that the use of a distributed RFID reader as disclosed herein can provide a number of improvements over a fully integrated RFID reader, where the RF front-end and baseband processing backend are combined in a single package. The following examples are generally applicable to all distributed RFID readers disclosed herein. For illustration purposes, these examples are described using the distributed RFID reader 610 in FIG. 6 as reference.

In conventional drone-based deployments, RF data captured by an integrated RFID reader on the drone is digitally processed at the baseband processing backend of the integrated reader. Often times, however, it may not be necessary to digitally process RF data on the drone itself. Thus, rather than mounting a fully integrated RFID reader to a drone as in conventional RFID systems, embodiments of the present disclosure allow for mounting only part of the distributed RFID reader 610, i.e., the RFID radio unit 620 containing the RF front-end 650. While the RF front-end 650 of the RFID radio unit 620 may handle radio signals captured on the drone, the RFID baseband processing unit 630 may digitally process such radio signals away from the drone (e.g., at a later time or immediately). As such, it may not be necessary to create, deploy, and constantly update unique software/middleware on each drone since decisions need not be made onboard.

Consequently, the use of a functionally-split RFID reader 610 on a drone can minimize onboard processing, which in turn can minimize power consumption on the drone. In addition, since the RFID radio unit 620 comprises fewer components than a fully integrated reader, a drone carrying the RFID radio unit 620 may weigh less than the drone would when carrying the fully integrated RFID reader. By reducing the weight and onboard processing, flight time of the drone may be increased. As such, a drone carrying an RFID radio unit 620 may operate longer and cover larger areas than a drone carrying a fully integrated RFID reader. In turn, less drones may be needed due to the increased flight time and coverage area of each drone carrying an RFID radio unit 620.

Additionally, since the RFID radio unit 620 comprises less and/or simpler components than a fully integrated reader, a drone carrying the RFID radio unit 620 may be less expensive than a drone carrying a fully integrated RFID reader. As such, less expenses may be allocated for repairs to a drone (e.g., damage repair in case of a crash) carrying the RFID radio unit 620. Further, functionality of the distributed RFID reader 610 can be updated without needing to change the drone. For example, RFID reader protocols and functionality can be updated by updating the remote (e.g., ground-based) RFID processing unit 630 while using the same RF front-end 650 in the RFID radio unit 620. Such updates may include routine maintenance, (re) installing drivers, updating driver versions, adding/updating firmware or software, etc.

In some implementations, the RFID processing unit 630 may be placed in a central location (e.g., server, cloud, data processing center, computer server room, etc.) with one or more other similar RFID processing units. In this manner, real-time data from all drones carrying an RFID radio unit reader can be used to coordinate activity. For example, data made available for processing by the RFID processing unit 630 on the ground may be used to determine whether to make changes to a drone's flight plan, where such changes may occur in real-time, e.g., mid-flight. As most drones are capable of being programmatically aimed at one or more targets (e.g., RFID tags), such real-time/mid-flight changes may include manipulating the drone's angle, trajectory, or the like.

In some implementations, the flight of each drone on which an RFID radio unit 620 is mounted can be optimized using real-time tag information read during the flight. For example, assume each drone-mounted distributed RFID radio unit 620 is capable of calling out a specific RFID tag among a plurality of RFID tags deployed in the WMS 100, which may perform an inventory audit. Further assume the WMS 100 expects to identify that specific RFID tag (or item associated therewith) during the inventory audit, but does not do so, e.g., perhaps because the tagged item is misplaced or shaped/oriented obliquely rather than flat (in which case the tagged item would generally be easier scan/detect).

In this scenario, the best course of action may be to modify the drone's flight plan to include a new area or to retrace an area where the tagged item was expected. Additionally/alternatively, the drone's field of view may be modified by adjusting at least one operating parameter of the drone, such as any one or more of the drone's azimuth, angle, vector, trajectory, or the like. In some aspects, one or more such modifications to the drone may occur dynamically, e.g., in response to what the drone detects or does not detect. In some aspects, the process of (re) attempting to detect/read a particular tagged item may be facilitated by silencing some or all RFID tags in the WMS 100 other than that particular tagged item. The RFID processing unit 630 can send tag information to the WMS 100 that implements such functionality.

In fixed-reader deployments, the hardware-based RFID radio unit 620 is less likely to need to be upgraded than its RFID processing counterpart. In many cases, upgrades to the distributed RFID reader 610 can be made by updating only the RFID processing unit 630, which may be in a more accessible location than the RFID radio unit 620. Moreover, since RFID reader functionality is split into two distinct units, only one unit (e.g., radio unit 620 or processing unit 630) may need to be replaced in the event of damage to or failure of either unit (i.e., rather than replacing an entire integrated reader where the RF front-end and baseband backend are packaged in a single unit). Further, at least one RF unit 620 or 630 may remain accessible in the case of communication failure with one of the RF units 620 or 630. By comparison, the baseband processing backend of a conventional integrated RFID reader cannot be accessed when a communication link between the backend and host device, e.g., server, computer, application, etc.

In mobile-reader deployments, RFID tag data from the RFID processing unit 630 can be immediately provided (e.g., to server 115 or servers 515). Thus, modifications to the distributed RFID reader 610 (e.g., aiming angle of the RFID radio unit 620, flight plan in case of a drone, etc.) may occur dynamically.

In some aspects, the RFID processing unit 630 may be implemented using dedicated hardware. In some aspects, the RFID processing unit 630 may be implemented in software running on generic processing. If the RFID processing unit 630 is implemented in software, for example, such as in a generic server or cloud, the ground-based components may be less expensive. In some aspects, the RFID processing unit 630 may be implemented using hardware and software.

Figure 10:
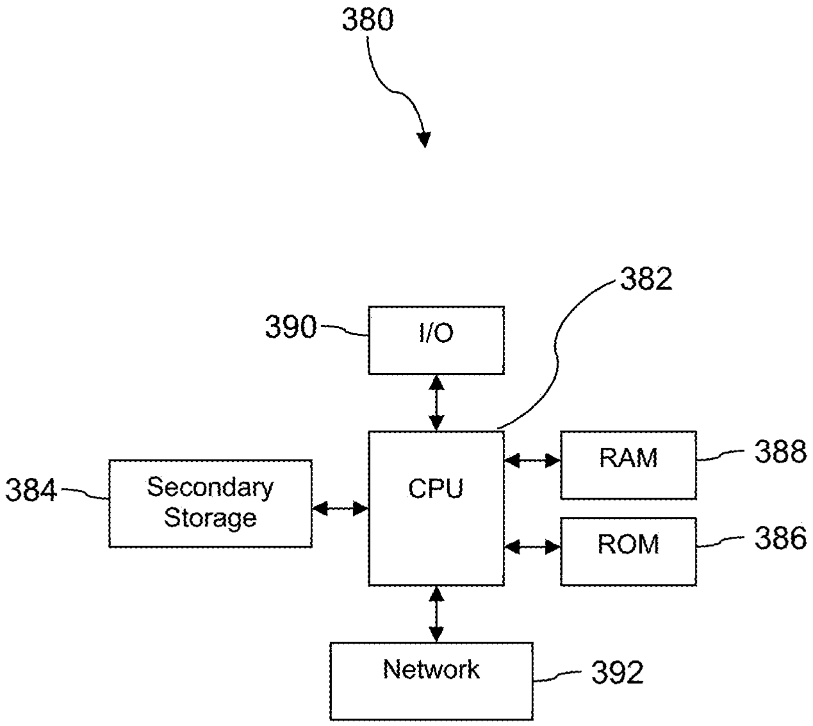
FIG. 10 is a block diagram of a computer system according to an embodiment of the disclosure.

FIG. 10 illustrates a computer system 380 suitable for implementing one or more embodiments disclosed herein. For example, in an embodiment, the server(s) 115 and the server(s) 515 described above may be implemented in a form similar to that of computer system 380. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain.

Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), Wi-Fi (IEEE 802.11), Bluetooth, Zigbee, narrowband Internet of things (NB IoT), near field communications (NFC), radio frequency identity (RFID), etc. The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers (e.g., server(s) 115 and/or server(s) 515) that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380.

The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A radio-frequency identification (RFID) system for identifying objects associated with RFID tags and promoting ease of maintenance of digital processing backends, the RFID system comprising:

a plurality of distributed RFID readers, wherein each distributed RFID reader is defined by an RFID radio unit and an RFID processing unit that is (i) physically isolated from each RFID radio unit and (ii) implemented in a central processing server configured to communicate with each RFID radio unit via a network; and a controller operatively connected to the plurality of distributed RFID readers, wherein the controller is configured to update each distributed RFID reader without updating each RFID radio unit of each distributed RFID reader.

2. The RFID system of claim 1, wherein the controller is configured to update each distributed RFID reader by updating software executable on each RFID processing unit.

3. The RFID system of claim 1, wherein each RFID radio unit is implemented using dedicated hardware.

4. The RFID system of claim 3, wherein each RFID processing unit is implemented in software.

5. The RFID system of claim 1, wherein the central processing server comprises at least one of a physical server, a virtual server, or a cloud server.

6. A distributed radio-frequency identification (RFID) reader system, comprising:

a plurality of RFID radio units comprising a plurality of respective radio frequency (RF) front-ends, wherein each RF front-end is configured to wirelessly communicate with at least one RFID tag, and wherein each RFID radio unit of the plurality of RFID radio units is mountable to a corresponding portable device; and an RFID processing unit configured to communicate with the plurality of RFID radio units, wherein the RFID processing unit is physically isolated from the plurality of RFID radio units, wherein the RFID processing unit comprises a baseband processing backend (i) configured to process RFID tag data from each RF front-end in the plurality of RFID radio units and (ii) implemented in a central processing server configured to communicate with each RF front-end via a network, and wherein the RFID processing unit is stationary.

7. The distributed RFID reader system of claim 6, wherein the central processing server is remote to the plurality of RFID radio units.

8. The distributed RFID reader system of claim 6, wherein the network comprises a local area network (LAN).

9. A distributed radio-frequency identification (RFID) reader, comprising:

an RFID radio unit comprising a radio frequency (RF) front-end configured to wirelessly communicate with at least one RFID tag, wherein the RFID radio unit is mountable to a portable device; and an RFID processing unit comprising a digital processing backend (i) configured to communicate with the RF front-end and (ii) implemented in a central processing server configured to communicate with the RF front-end via a network, wherein the RFID processing unit is physically isolated from the RFID radio unit, and wherein the RFID processing unit is stationary.

10. The distributed RFID reader of claim 9, further comprising:

a first transceiver disposed in the RFID radio unit; and a second transceiver disposed in the RFID processing unit, wherein the RFID processing unit is configured to communicate with the RFID radio unit over a direct wireless communication link established between the second transceiver and the first transceiver.

11. The distributed RFID reader of claim 9, wherein the portable device comprises a drone, a robot, or a forklift.

12. The distributed RFID reader of claim 9, wherein the RFID radio unit is configured to communicate with the RFID processing unit via a wireless device.

13. The distributed RFID reader of claim 12, wherein the wireless device is configured to communicate with the RFID processing unit over an additional network.

14. The distributed RFID reader of claim 9, wherein the RF front-end comprises a hub configured to support simultaneous connections to multiple antennas through which the RF front-end communicates with the at least one RFID tag, and wherein the digital processing backend comprises a switch controller configured to manage connectivity between the hub and the multiple antennas.

15. The distributed RFID reader of claim 9, wherein the RF front-end is configured to transmit a power RF signal to the at least one RFID tag in a frequency band between 2.95 gigahertz (GHz) and 3.0 GHz.

16. The distributed RFID reader of claim 15, wherein the at least one RFID tag comprises a passive RFID tag, and wherein the power RF signal is configured to provide energizing power to the passive RFID tag.

* * * * *